(12) United States Patent
Hansen

(10) Patent No.: US 7,025,148 B2
(45) Date of Patent: Apr. 11, 2006

(54) VEHICLE WITH AN ATTACHMENT

(75) Inventor: Poul Erik Hansen, Gjern (DK)

(73) Assignee: Sauer-Danfoss APS, Nordborg (DK)

( * ) Notice: Subject to any disclaimer, the term of this patent is extended or adjusted under 35 U.S.C. 154(b) by 98 days.

(21) Appl. No.: 10/798,523

(22) Filed: Mar. 11, 2004

(65) Prior Publication Data

US 2004/0177977 A1    Sep. 16, 2004

(30) Foreign Application Priority Data

Mar. 14, 2003 (DE) .................. 103 11 156

(51) Int. Cl.
*A01B 41/06* (2006.01)

(52) U.S. Cl. ........................................ 172/2
(58) Field of Classification Search ............... 172/2, 172/3, 4, 7, 8, 10, 439; 701/50

See application file for complete search history.

(56) References Cited

U.S. PATENT DOCUMENTS

| | | | | |
|---|---|---|---|---|
| 4,846,283 A * | 7/1989 | Batcheller | ................. | 172/10 |
| 4,878,543 A * | 11/1989 | Kauss | ............. | 172/2 |
| 5,320,186 A * | 6/1994 | Strosser et al. | ................. | 172/8 |
| 5,421,416 A * | 6/1995 | Orbach et al. | ................. | 172/4 |
| 5,455,769 A * | 10/1995 | Panoushek et al. | ........... | 701/50 |
| 5,550,733 A * | 8/1996 | Yun et al. | ..................... | 700/69 |
| 5,960,695 A | 10/1999 | Aardema et al. | | |
| 6,016,875 A * | 1/2000 | Orbach et al. | ................. | 172/2 |
| 6,058,343 A | 5/2000 | Orbach et al. | | |
| 6,725,131 B1 * | 4/2004 | Lunzman | ................... | 700/282 |
| 2003/0121674 A1* | 7/2003 | Scarlett et al. | ................. | 172/2 |

* cited by examiner

*Primary Examiner*—Victor Batson
(74) *Attorney, Agent, or Firm*—McCormick, Paulding & Huber LLP

(57) ABSTRACT

The invention concerns a vehicle with an attachment, which has a lifting drive with at least one hydraulic cylinder and a control device, the control device having a position sensor and a position generator. It is endeavored to improve the position control of the attachment. For this purpose, the control device has a trajectory generator, which generates a trajectory in dependence of a desired position value and an acceleration limit, said trajectory being optimized with regard to a time specification, and a follower, which controls the lift drive in dependence of the trajectory.

11 Claims, 2 Drawing Sheets

VEHICLE WITH AN ATTACHMENT

CROSS-REFERENCE TO RELATED APPLICATIONS

This application is entitled to the benefit of and incorporates by reference essential subject matter disclosed in German Patent Application No. 103 11 156.5 filed on Mar. 14, 2003.

FIELD OF THE INVENTION

The invention concerns a vehicle with an attachment, which has a lifting drive with at least one hydraulic cylinder and a control device, said control device having a position sensor and a position indicator.

BACKGROUND OF THE INVENTION

In the following, the invention is described on the basis of a tractor, whose toolbar (hitch) can be used for fitting different attachments. This could, for example be a plough, a harrow, a mower or another tool. However, the invention is not limited to a tractor being the vehicle. Also other vehicles can have attachments, for example street sweepers, forestry machines etc.

During operation, the attachment should be set to a position, that is, a height, which corresponds to the application purpose. For example, a plough, which is fixed on a tractor, should be able to penetrate to a certain depth into the earth. A too large or a too small depth in not wanted. However, the set position is not maintained for the whole operation duration of the tractor. For example, the plough has to be lifted, when the tractor leaves the field to drive to another field. The plough also has to be lifted, when the tractor changes its driving direction, however, the blocks should be thrown in the same direction. After the lifting, the plough has to be returned to the previously set position.

The combination of a hydraulic cylinder and a control device forms part of an electro-hydraulic position control. When, during lifting, the amount of hydraulic fluid supplied to the cylinder is controlled, a substantially load independent lifting movement can be realised. The speed of the cylinder in the lifting direction can be kept substantially proportional to a control signal. The maximum speed of the cylinder is thus proportional to a maximum desired value of the control signal, and the amplification is constant and independent of the load.

When lowering the load, that is, the attachment, however, it is different. Particularly with single-acting cylinders, the lowering movement can usually not be made load independently. Attachments with a higher weight sink faster than attachments with a lower weight. This leads to variants in the rule amplification in connection with the position control for varying loads.

From U.S. Pat. No. 4,846,283 is known a vehicle, with which the lowering speed of the attachment can be braked. To a certain limit, a control signal and thus the maximum deflection of the valve can be adjusted. This applies for a predetermined load. When, however, the load changes, a new adjustment or setting is required.

U.S. Pat. No. 6,016,875 describes a control, which sets the amplification iteratively, which is proportional to the desired lifting speed. The process shown is based on an overshoot and requires some iteration steps. During this iteration, the driver may have an unpleasant feeling, when the acceleration changes.

U.S. Pat. No. 5,320,186 describes a method of achieving a constant and load-independent maximum speed when changing the position of the attachment. This method uses a speed control, which differentiates the position of the attachment numerically, in order to detect its speed. This speed is compared with a desired speed, in order to detect a speed error, which is then supplied to an integrator. Thus, this control substantially corresponds to a proportional position error control having a ramp function as reference. The gradient of the ramp is the desired speed.

In controls with a simple design, this method may lead to too high speeds. In controls, situations may occur, in which the position control and the speed control work against each other, which involves the risk that too high speeds occur. Additionally, too high accelerations may occur. On the one hand, these may cause damage. On the other hand, when lifting the load, the front wheels may lift off from the ground, which can lead to dangerous situations.

Based on the foregoing, it is the general object of the present invention to improve the position control of the attachment.

SUMMARY OF THE INVENTION

With a vehicle as mentioned in the background, this task is solved in that the control device has a trajectory generator, which generates a trajectory in dependence of a desired position value and an acceleration limit, said trajectory being optimised with regard to a time specification, and a follower, which controls the lift drive in dependence of the trajectory.

With this embodiment it is achieved that the attachment can be moved to the desired position without the occurrence of inadmissibly high acceleration values. The trajectory generator endeavours to place the movement in a "time window", which is specified by the time specification. Usually, the user of the vehicle will select the time to be as short as possible. However, it is also possible for him to specify a longer time on purpose. The time specification results in a speed, with which the attachment should be moved. However, the trajectory generator limits the speed increase and the speed decrease so that no inadmissibly high accelerations and thus no inadmissibly high forces occur.

It is also advantageous, when the trajectory generator also takes at least one speed specification into consideration. In this case, for example, the speed can be limited.

Preferably, the acceleration limit is adjustable. The user can then adapt the maximum permissible acceleration to various attachments. For example, with light attachments larger acceleration values may be acceptable than with heavier attachments.

It is also preferable that the time specification is adjustable. The user can then decide if, for the movement of the attachment, he will accept a longer or a shorter time. However, it must be observed that the selection of the time specification does not always ensure that this time specification is always achieved. Limits are, for example, set by the acceleration limit. In certain cases, also speed specifications have to be considered, for example a maximum speed. In each case, however, the trajectory generator will try to approach the time specification as much as possible.

In addition, it is desirable that the control device has an inlet control and an outlet control for the cylinder. Thus, both the lifting movement and the lowering movement of the cylinder can be adjusted. This applies for both a cylinder in the form of a single-acting cylinder and a cylinder in the form of a double-acting cylinder.

Preferably, the outlet control has electronic control means. The inlet control is relatively easily realised, for example via a pressure control valve, which keeps the pressure over a control valve constant. As, particularly with a single-acting cylinder, the outlet control depends on being driven by the weight of the attachment, such a control cannot always be realised. In this case electronic control means can be used, which ensure a larger flexibility.

It is preferred that the outlet control has a flowmeter and a pressure sensor. Here, the term "flowmeter" is mainly to be understood functionally. The crucial point is to measure the flow. For this purpose, the "flowmeter" can either be mechanical or electronic. For example, also a pressure drop over the valve can be measured, or the absolute pressure, when tank pressure rules on the other side of the valve. When the opening of the valve is known, for example due to an electrical control of the valve, the flow is also "known". Preferably, the pressure sensor has a signal outlet, whose signal can be processed electronically, for example by a microcontroller or a microcomputer.

Preferably, the control device has a valve arrangement, which controls the outlet of the cylinder, and the outlet control forms an inverted model of the valve arrangement that uses pressure. By means of this inversed model a control can be realised, which can, at least for certain distances, do without a feedback. This simplifies the control.

It is preferred that the transfer function of the trajectory to the inversed model results in the unit function. To put it more simply, the multiplication of the trajectory with the inversed model gives the value 1. The subsequent control of the position, for example because of the pressure, is then further simplified.

In an alternative embodiment it may be ensured that the outlet control has an estimation function, which uses a load pressure and is part of a control circuit. In this case, the outlet of the cylinder is estimated by means of measured parameters, for example pressure, and the estimated value is compared with a specified value. Thus, a trajectory can also be followed with a good proximity.

Preferably, the follower is made to be adaptive. Thus, it adapts, when errors occur.

BRIEF DESCRIPTION OF THE DRAWINGS

In the following, the invention is described in detail on the basis of preferred embodiments in connection with the drawings, showing.

DETAILED DESCRIPTION OF THE PREFERRED EMBODIMENTS

Figure 1:
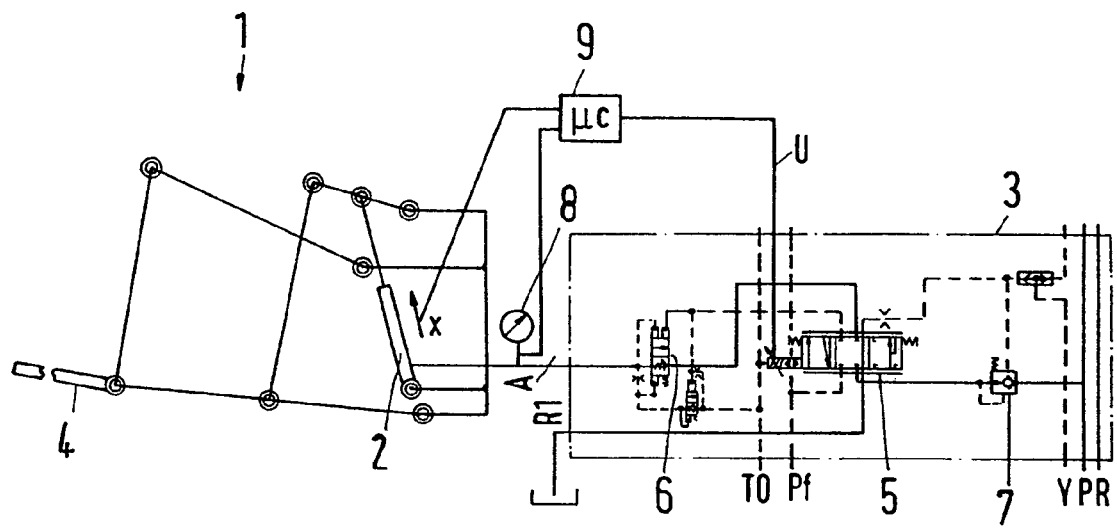
FIG. 1 shows a schematic view of a control of an attachment

FIG. 1 shows a schematic view of an attachment 1 in a vehicle (not shown in detail), for example a toolbar of a tractor. The attachment 1 has a hydraulic cylinder 2, which in the present embodiment is made as a single-acting cylinder. However, it is also possible to use a double-acting cylinder instead of a single-acting cylinder 2.

A control device 3, which will be explained in detail in the following, controls the cylinder 2. A load 4 is attached to attachment 1 to show that the attachment must be able to lift a corresponding load.

The load 4 can, for example, be a plough, which must be pulled by a tractor. This plough must have a certain penetration depth into the earth. This penetration depth is achieved in that the attachment 1 is set to a certain height position, in the following called "position". In FIG. 1, this position is shown by "x". However, it is not sufficient to set this position once. When the tractor changes its driving direction, and the plough has to throw the blocks in different directions, or when the tractor leaves the field, the plough must be lifted. After reassuming the work, the plough has to be lowered to the desired position again.

For this purpose, the control device 3 has a 3-way, 3-direction control valve 5 in the form of a proportional valve. By means of the control valve 5 it is possible to let hydraulic fluid flow from a pressure connection P to the inlet A of the hydraulic cylinder 2 to lift the load. Or the load 4 can be lowered by means of the control valve 5 by connecting the inlet A of the cylinder 2 with a tank outlet R1.

Alternatively, the control valve 5 can also be divided into two valves, as known, for example, from U.S. Pat. No. 6,058,343. In this case, one valve serves the purpose of lifting the load 4 and one serves the purpose of lowering the load 4. In the case of a double-acting cylinder, a valve can be used, which controls four ways and three directions. Also such a valve can be divided into two valve parts or four valve parts for the separate control of the individual functions, as known from U.S. Pat. No. 5,960,695.

The hydraulic system, which comprises the cylinder 2 and the control device 3, has a pilot-controlled non-return valve 6, which can be used, when it is desired to avoid a leakage from the connection A, so-called zero-leakage. In this connection, FIG. 1 shows that a pilot pressure Pf is supplied to the pilot-controlled non-return valve 6 via the control valve 5. Alternatively, the pilot pressure can be supplied directly or via a solenoid valve. This causes that the non-return valve 6 can be controlled independently of the position of the control valve 5. This may be advantageous in cases involving a control, in which the dynamics of the pilot-controlled non-return valve 6 plays a role.

For the inlet control is used a pressure control valve 7, which produces a constant pressure drop over the control valve 5. Thus, in wide limits, a load-independent lifting behaviour of the cylinder 2 can be achieved.

For the outlet control is used a pressure sensor 8 and a microcontroller 9. The pressure sensor 8 produces an output signal, which can be evaluated by the microcontroller 9. The pressure compensation can be made in different ways, for example by means of a feedback linearisation or with a flow estimation function and control. The microcontroller 9 also serves as position sensor, that is, it detects the position "x". This is shown schematically by a line from "x" to the microcontroller 9.

Figure 2:
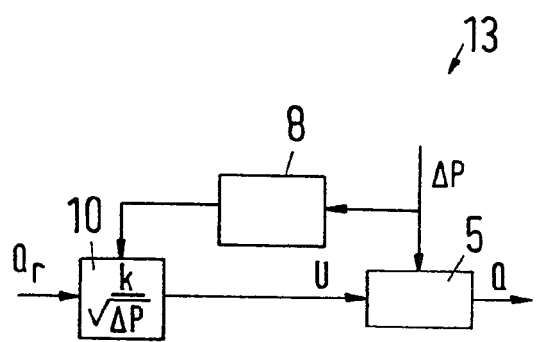
FIG. 2 shows a first embodiment of an outlet control

FIG. 2 shows the principle of the feedback linearisation. The measured pressure drop $\Delta P$, that is, the pressure difference between the connection A of the cylinder 2 and the outlet R1, is led back to an inverted model 10 of the valve 5, which results in a linearised feedback system, in which the desired flow $Q_r$ is equal to the flow $Q$, independently of the load pressure. k is a valve constant.

Figure 3:
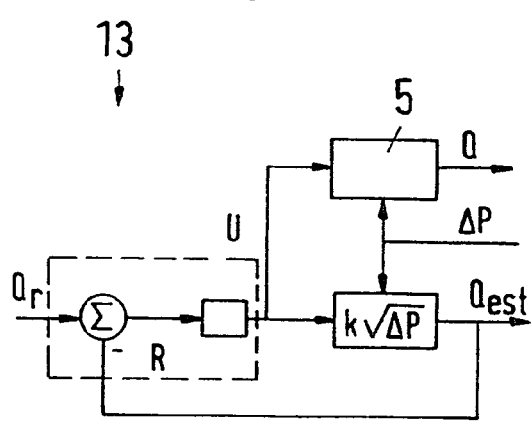
FIG. 3 shows a second embodiment of an outlet control

FIG. 3 shows a model, which uses an estimation function to control the outlet of fluid from the cylinder 2. The estimated flow $Q_{est}$ is fed back and compared with the specified reference flow $Q_r$ in a controller R. This flow is simply estimated in that the pressure difference $\Delta P$ between the connection A of the cylinder 2 and the return connection R1, and the valve control signal U, are converted with a throttling behaviour.

Also in this case it can be achieved with good proximity that the flow Q leaving the cylinder 2 is in fact equal to the desired flow $Q_r$.

When a double-acting cylinder is used instead of the hydraulic cylinder 2, and for this reason the inlet control and the outlet control is separated, for example with two or four control valves, then the outlet pressure and the inlet pressure must be controlled to avoid that the load 4 runs away. However, in many cases the separation is not required. When a 4-way, 3-direction valve (4/3-valve), which is controlled on the basis of the flow (meter-in flow controlled valve), is used to control the double-acting cylinder, the flow in both directions is proportional to the control signal, provided that the valve has been dimensioned correctly for the maximum load. In this case a return-flow measuring (meter-out) is not required.

Figure 4:
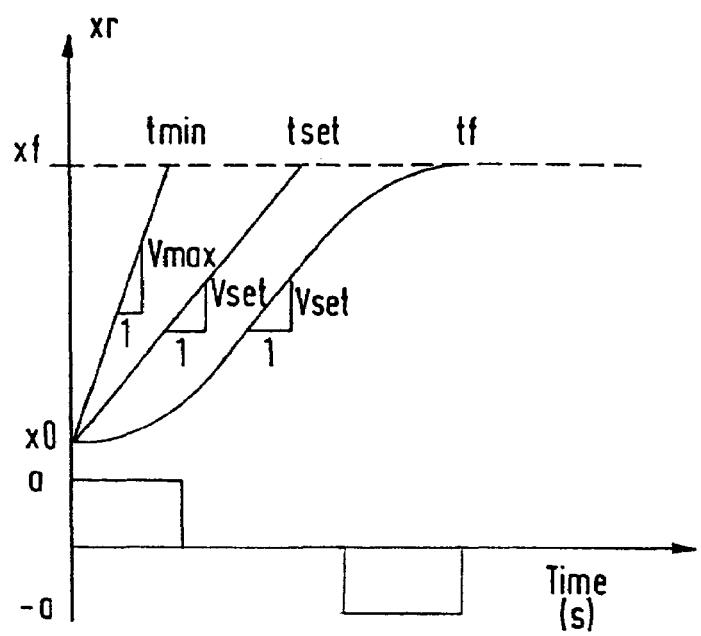
FIG. 4 shows various speed courses

As the flow control device produces a linear function between the desired flow value inlet $Q_r$ and the speed of the load dx/dt, the fastest movement time, as shown in FIG. 4, between the positions x0 and xf is the time $t_{min}$ (in seconds), $v_{max}$ being the maximum speed at completely open valve 5 and a load pressure ΔP. When a lower speed $v_{set}$ is desired, the opening time $t_{set}$ of the valve 5 must be longer to achieve the same movement.

Theoretically, the linear profiles shown require an indefinitely large acceleration. In practice, the pressure ΔP limits the acceleration, with large loads it may, however, happen anyway that the front wheels leave the ground, because the inertia forces are too large.

For this reason, an acceleration limit is introduced, as shown in FIG. 4. The acceleration profile has a maximum a and a minimum −a. The position of the load is simply found in that the acceleration profile is integrated twice and the desired speed $v_{set}$ is included, that is, is used as integration limit. This gives a controlled acceleration, which, however, causes a somewhat longer movement time tf. The profile is optimal in that it gives the shortest movement time for a predetermined maximum acceleration and a maximum speed. The speed can also be replaced by a time specification.

A further integration will convert the speed profile to a trajectory for the movement of the load 4 or the attachment 1, respectively. This is obvious to a person skilled in the art and therefore not shown in detail.

When other acceleration limits are chosen, the speed course will change. However, in any case it can be avoided that a maximum acceleration is exceeded.

When a monitoring of both acceleration and speed is wanted, the desired trajectory gets somewhat more complicated. For this reason, a follower is expedient.

Figure 5:
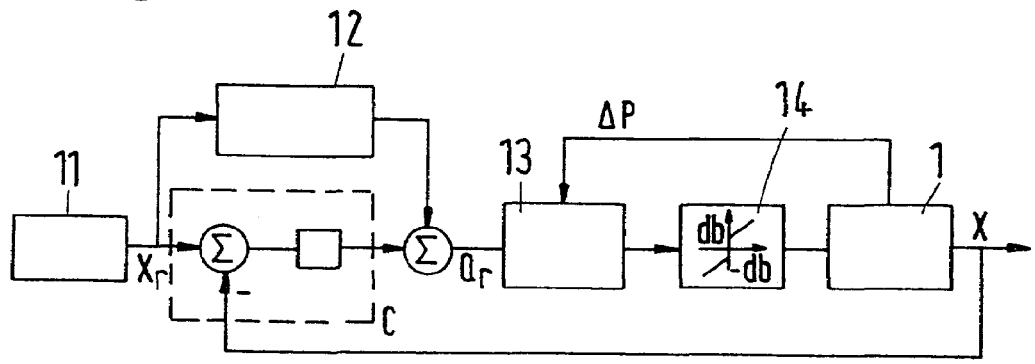
FIG. 5 shows a first embodiment of a follower

FIG. 5 shows a first embodiment of such a follower. As described above, a trajectory generator 11 produces a trajectory, that is, the individual positions x over the time, as shown, for example in FIG. 4. The control has a directly connected part, which represents an inverted model 12 of the attachment 1. The transfer function from $x_r$ (specification) to x will thus be 1. This does not necessarily mean that $x_r$=x, and also not that x approaches the course $x_r$. As, however, the attachment system itself is unstable, a position control with a controller C is additionally used. The immediate position x of the load 4 is supplied to this controller C. The effect of this measure is that x approaches the specification $x_r$ and that the control system gets stabler in relation to parameter variations and interferences.

In a preferred embodiment, the model approaches the attachment with a constant and an integrator in such a manner that the inverted model becomes a constant and a differentiator. The approach simplifies the control and is sufficiently accurate for moderate accelerations. The controller C is dimensioned so that the control system has a predetermined stability area.

It is expedient to arrange a dead-band compensator 14 between the outlet control 13, as shown, for example, in FIG. 2 or FIG. 3, and the system of the attachment 1, in order to compensate a dead-band db, which is required in the valve 5 to let the load-sensing and pilot pressure signals pass. Of course, the system described can be used in both directions, that is, both when lifting and when lowering a load. During lifting, the outlet control 13 will play no role.

Figure 6:
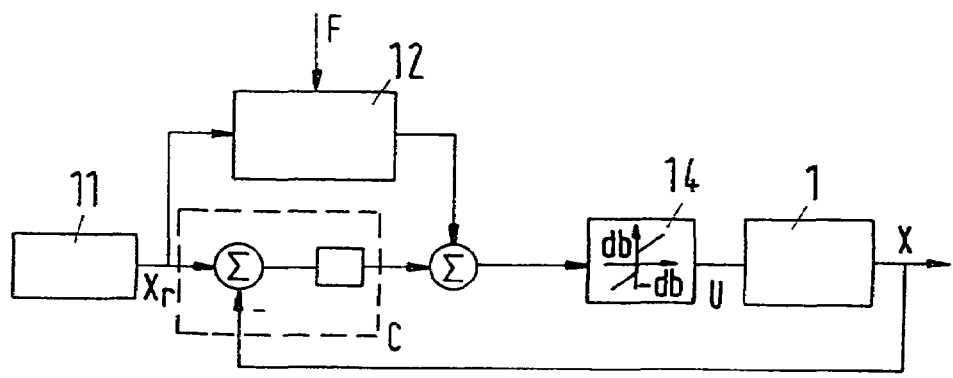
FIG. 6 shows a second embodiment of a follower

An alternative method for combining an outlet control and a follower is shown in FIG. 6. This embodiment comprises an adaptive follower. In this case an outlet control is not absolutely necessary, when the load is constant or changes slowly. The adaptive follower adapts the inverted model of the system of the attachment 1.

What is claimed is:

1. A vehicle with an attachment, said attachment comprising:
   a lifting drive with at least one hydraulic cylinder and a control device;
   said control device having a position sensor and a position generator;
   said control device having a trajectory generator, which generates a trajectory in dependence of a desired position value and an acceleration limit, said trajectory being optimised with regard to a time specification; and
   a follower, which controls the lift drive in dependence of the trajectory.

2. The vehicle according to claim 1, wherein the trajectory generator also takes at least one speed specification into consideration.

3. The vehicle according to claim 1, wherein the acceleration limit is adjustable.

4. The vehicle according to claim 1, wherein the time specification is adjustable.

5. The vehicle according to claim 1, wherein the control device has an inlet control and an outlet control for the cylinder.

6. The vehicle according to claim 5, wherein the outlet control has an electronic control.

7. The vehicle according to claim 6, wherein the outlet control has a flowmeter and a pressure sensor.

8. The vehicle according to claim 7, wherein the control device has a valve arrangement, which controls an outlet of the cylinder, and the outlet control forms an inverted model of the valve arrangement that uses flow and pressure.

9. The vehicle according to claim 8, wherein a transfer function of the trajectory to the inverted model results in a unit function.

10. The vehicle according to claim 1, wherein an outlet control has an estimation function, which uses a load pressure and is fixed in a control circuit.

11. The vehicle according to claim 1, wherein the follower is made to be adaptive.

* * * * *